April 30, 1968  T. S. ZASTROW  3,380,703
SUPPORTING FIXTURE FOR FOAM-FILLED ARTICLES
Filed Jan. 10, 1966  2 Sheets-Sheet 1
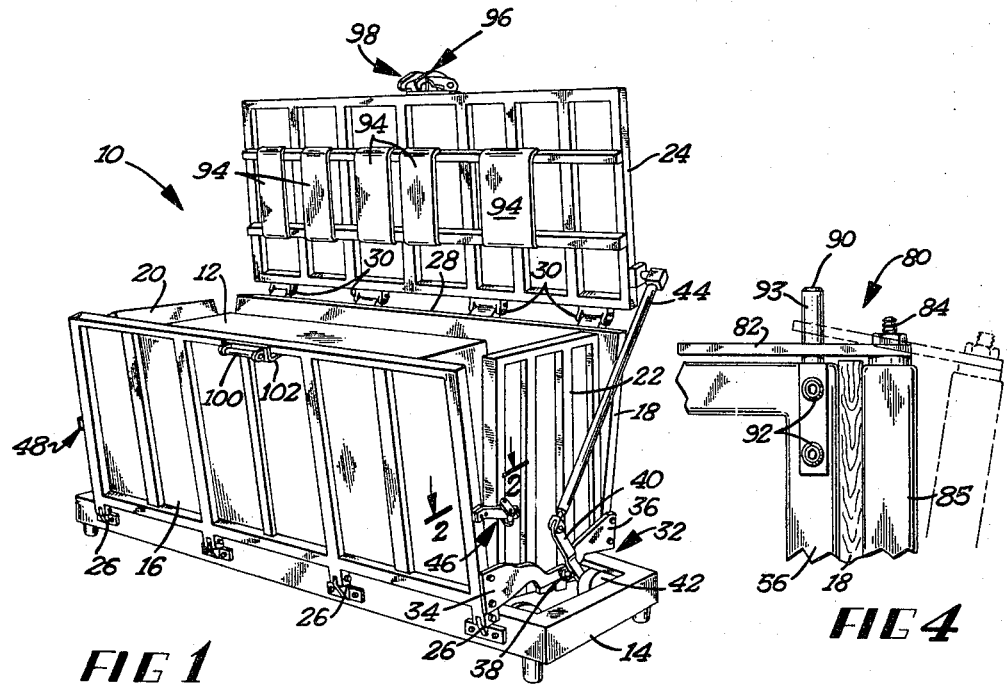
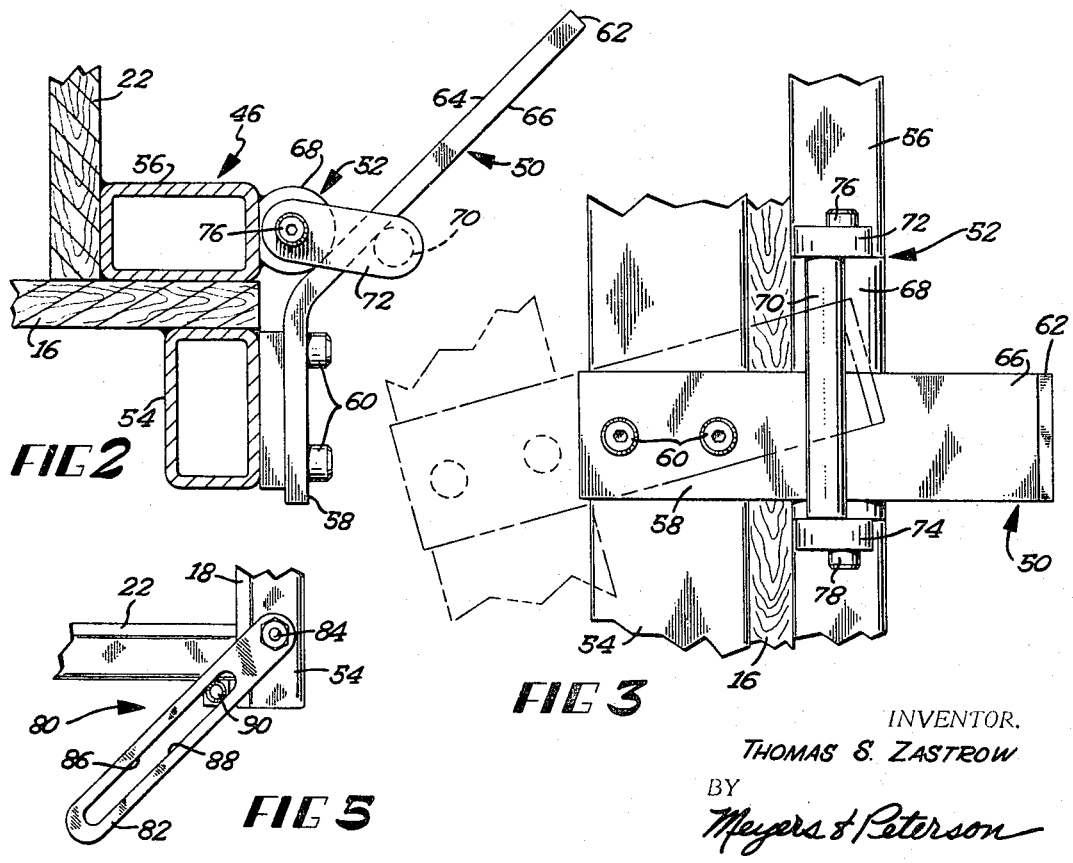
INVENTOR.
THOMAS S. ZASTROW
BY
Meyers & Peterson
ATTORNEYS April 30, 1968  T. S. ZASTROW  3,380,703
SUPPORTING FIXTURE FOR FOAM-FILLED ARTICLES
Filed Jan. 10, 1966  2 Sheets-Sheet 2
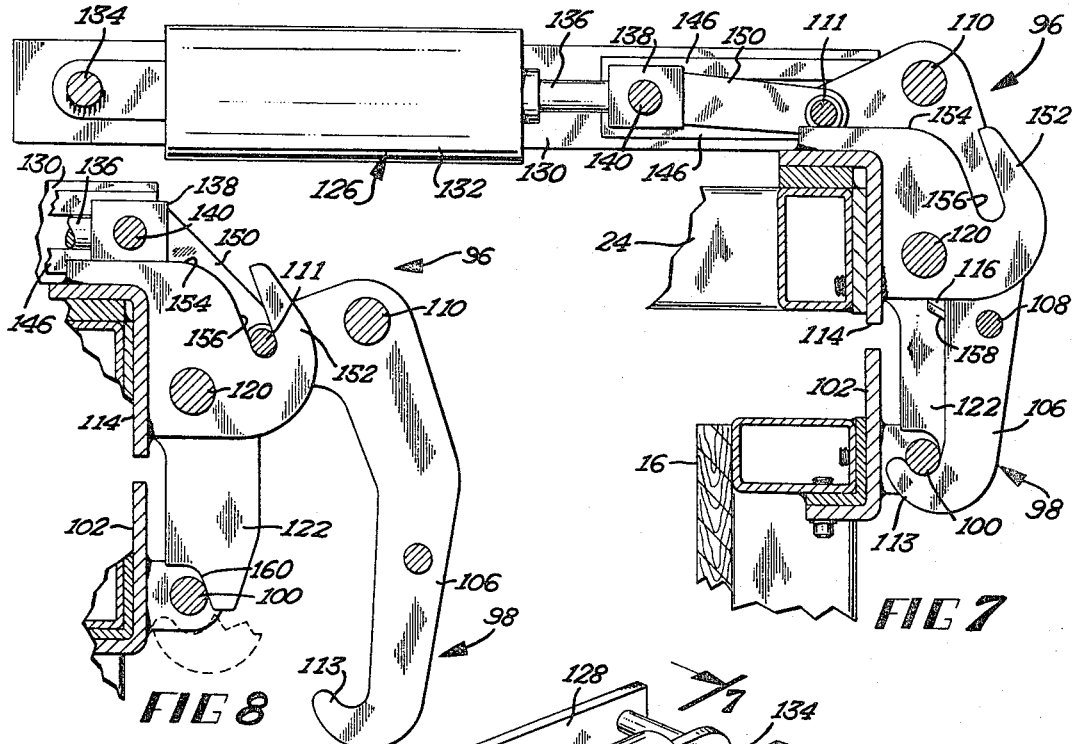
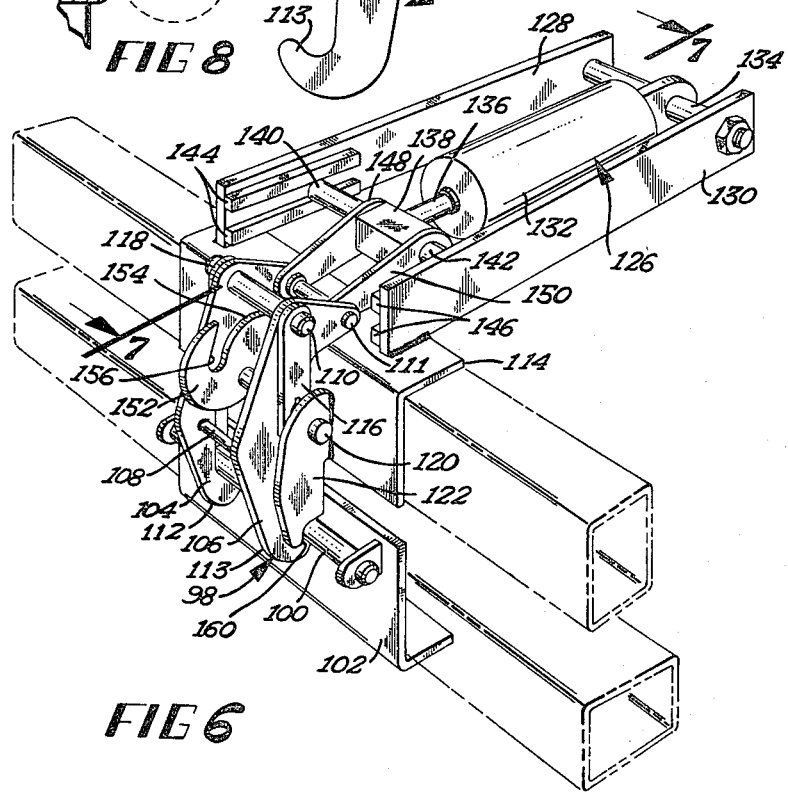
INVENTOR.
THOMAS S. ZASTROW
BY
Meyers & Peterson
ATTORNEYS

United States Patent Office 3,380,703
Patented Apr. 30, 1968

3,380,703
SUPPORTING FIXTURE FOR FOAM-FILLED ARTICLES
Thomas S. Zastrow, St. Paul, Minn., assignor to Remmele Engineering, Inc., St. Paul, Minn., a corporation of Minnesota
Filed Jan. 10, 1966, Ser. No. 519,504
14 Claims. (Cl. 249—172)

This invention pertains to the fabrication of foamed-in-place resin filled articles. More particularly, the invention relates to a supporting fixture for providing mechanical support for such an article during the foaming and expansion of the resin therewithin.

Foamed resins, such as rigid foamed polyurethane for example, have been used increasingly for thermal insulation purposes. In the manufacture of appliances such as refrigerators and freezers, it has become common practice to provide an outer shell and an inner liner for the article, to support the liner within the shell and to foam a resin in the space between the shell and liner to form the insulated walls of the appliance. The resin when cured has excellent structural properties in addition to its thermal properties so that the thicknesses of the shell and liner may be minimized and intermediate structural supports are not required.

In expanding to fill the voids in the article, the foaming resin exerts substantial pressure on the confining outer surfaces of the article. To prevent distortion or displacement of the surfaces under these conditions of pressure, it is necessary to support or reinforce them and this is normally accomplished by means of a fixture having supporting panels which bear against the article. The present invention has for one of its objects the provision of an improved fixture for this purpose. In this regard, it is an aim of the invention to provide a fixture useful in the mass production of foamed-in-place resin filled articles, particularly a fixture which may be quickly and efficiently operated between an open condition, in which the parts of the articles may be easily inserted and the finished article readily removed, and a closed and locked condition during the foaming process itself.

Another object of the invention is the provision of a fixture having the characteristics outlined above but which is simple in construction, employing a minimum of parts. To accomplish this objective, the various supporting panels of the fixture are mounted on a suitable base member for movement between their open and closed positions, and relatively simple coupling means are provided to connect certain of the panels together to move as a unit and to act together to resist the outward forces produced in the foaming process. Moreover, a powered latching means is employed to hold the various panels in the closed condition and the coupling arrangement is such that the holding force applied by the latching means is transferred or distributed to all of the panels. A principal advantage of this construction is that only a single latch is required to hold all the panels in position to resist the outward forces produced in the foaming process.

Still another object of the invention is the provision of an improved latching means for holding the fixture in its closed condition. More particularly, this object of the invention is to provide a powered latching means which may be quickly and efficiently moved between its latching and non-latching conditions and which is compactly arranged with respect to the fixture panels on which it is mounted, that is, in which the parts do not project outwardly from the panels of the fixture to such an extent that they could be easily damaged. As will appear more fully below, the latching means which fulfills this objective has a hook or claw mounted on one panel, the claw being actuated into and out of engagement with a latch pin on an opposite panel by a power means such as a fluid motor. A cam is provided for guiding the motion of the claw so that it will clear the pin when the panels are opened or closed with respect to one another. Another novel feature of the latching means resides in the fact that the latching direction of the claw and the orientation of the motor are at an angle so that the parts may lie closely adjacent the fixture panels. In this respect, the cam also acts, along with other parts of the latching means, to transpose the motor force into the latching direction.

Other objects, advantages and new features of the invention will become apparent from a reading of the following detailed description when taken in conjunction with the accompanying drawings wherein:

FIGURE 1 is a perspective view of a fixture constructed in accordance with the present invention, the fixture being shown in its open or retracted condition;

FIGURE 2 is a sectional view through one corner of the fixture of FIGURE 1, taken in the direction of the arrows 2—2 and illustrating the construction of one form of panel coupling means;

FIGURE 3 is an elevational view of the panel coupling means illustrated in FIGURE 2, showing the closed orientation thereof in solid lines and the open orientation thereof in phantom lines;

FIGURE 4 is a partial elevational view of a second form of panel coupling means which may be used in lieu of that shown in FIGURES 2 and 3;

FIGURE 5 is a top plan view of the panel coupling means shown in FIGURE 4;

FIGURE 6 is a perspective view of a latching means employed to hold the present fixture in its closed condition;

FIGURE 7 is a sectional view through the latching means taken on the line 7—7 of FIGURE 6; and FIGURE 8 is a view similar to FIGURE 7 but showing the latching means in its open or unlatched condition in solid lines and showing an intermediate position of the hook end of the latching claw in phantom lines.

A fixture constructed in accordance with one preferred embodiment of this invention is generally designated at 10 in FIGURE 1. Fixture 10 is illustrated in its open condition, revealing an article 12 which may be, for example, a refrigerator or freezer cabinet as referred to above, the refrigerator or freezer cabinet having a plurality of angularly related external surfaces which require support during the foaming process. The cabinet will also have a liner requiring support, and those skilled in the art will appreciate that the liner may be supported by means of a suitable core structure, this aspect of the fixture 10 not forming part of the present invention.

Fixture 10 includes a base 14 for supporting the article 12 and the supporting panels of the fixture 10. The various supporting panels of the fixture 10 consist of a plurality of side panels including a front panel 16, a back panel 18 and a pair of end panels 20 and 22, and a top panel 24. Each of the supporting panels is mounted so as to be movable from a supporting position in which the panel lies in parallel abutting relation to the surface of the article 12 which is being supported and a retracted position for permitting ready insertion and withdrawal of the article. The retracted or open position of the parts is shown in FIGURE 1.

In the illustrated embodiment, the panels are pivotally movable. For example, the front panel 16 is pivotally mounted on the base 14 by means of suitable hinges 26. The back panel 18 is similarly mounted, although its hinges do not appear in FIGURE 1. The end panels 20 and 22 are also pivotally mounted on the base 14 on hinges not shown, and the top panel 24 is pivotally attached to the top edge 28 of the back panel 18 by means of the hinges 30.

A link mechanism 32 is preferably utilized to actuate the front panel 16 and the back panel 18 into their closed positions simultaneously with manual lowering of the top panel 24. Linkage 32 consists of a pair of actuating arms 34 and 36 fixedly attached to the front panel 16 and the back panel 18, respectively, and pivotally attached to each other by means of a pivot pin 38. Pivot pin 38 protrudes outwardly from the actuating arm 36 and is abutted by a lever 40 which is pivotally mounted at one of its ends in a suitable bearing member 42 on the base 14, the other end of lever 40 being connected with the top panel 24 by means of a link member 44. The arrangement is such that when the top panel 24 is moved to its closed position, the lever 40 will be caused to rotate in the counterclockwise direction as seen in FIGURE 1 so as to press the pivot pin 38 downwardly, thus drawing the front panel 16 and the back panel 18 inwardly toward the work.

The end panels 20 and 22 are also positively moved into supporting relation to the work upon closure of the top panel 24. For this purpose, a pair of panel coupling means 46 and 48 respectively, are provided, the panel coupling means 46 acting between the front panel 16 and the end panel 22 as shown, and the panel coupling means 48 acting between the front panel 16 and the end panel 20. The actuation of the end panels 20 and 22 from the front panel 16 is illustrative only, and it will be understood that the panel coupling means may be connected between the end panels and the back panel with equal results.

FIGURE 2 illustrates the construction of the coupling means 46, panel coupling means 48 being similarly made. As shown, panel coupling means 46 includes a cam bar 50 and a cam follower element 52, each rigidly attached to the frame members 54 and 56 of the front panel 16 and the end panel 22, respectively. In this embodiment, the bar 50 is bent so as to provide a leg 58, which is fixedly attached to the frame member 54 by means of screws or bolts 60, and a leg 62 which provides a pair of external parallel cam surfaces 64 and 66, disposed at an angle so that motion of one panel will produce motion of the other. The angle of the cam surfaces is not critical and may be varied to suit particular requirements. For example, if a one-to-one ratio between the displacements of the panels is desired, the cam surfaces are disposed at an angle equal to half the angle between the directions of movement of the coupled side panels.

The cam follower element 52 of the panel coupling means 46 consists of a first cam follower 68 of generally cylindrical cross section, which is fixedly attached to the frame member 56 of the end panel 22. As shown, the cam follower 68 bears against the cam surface 64 on the leg 62 so as to transfer inward or closing motion of the front panel 16 directly to inward or closing motion of the end panel 22. A second cylindrical cam follower element 70 is arranged with its axis parallel to that of the first cam follower 68, and is rigidly attached to end panel 22 by means of a pair of brackets 72 and 74 connected, by means of bolts 76 and 78, to the cam follower 68, the arrangement permitting adjustment of the position of the cam follower 70. As shown, the cam follower 70 is arranged to bear against the cam surface 66 to transfer the opening motion of the front panel 16 to the end panel 22.

FIGURES 4 and 5 illustrate a second form of panel coupling means, in this case designated by reference number 80, and acting between back panel 18 and end panel 22. In this embodiment, the panel coupling means 80 includes a bar 82 which is rigidly mounted by means of a stud 84 at the top of the frame member 85 of the back panel 18. Bar 82 is provided with an elongated slot as shown in FIGURE 5, the sides 86 and 88 of the slot defining the parallel cam surfaces. As in the foregoing embodiment, these cam surfaces are disposed at an angle which will provide a one-to-one-ratio between the motions of the two panels. The cam follower portion of the cam coupling means 80 consists of a pin 90 which is rigidly mounted in upstanding relation on the frame member 56 of the end panel 22, as by means of bolts 92. The upper portion 93 of pin 90 is cylindrical and of such diameter that it just fits slidingly between the cam surfaces 86 and 88. It will be apparent that the panel coupling means 80 operates similarly to panel coupling means 46. Thus, outward opening motion of the back apnel 18 will be positively transferred to the pin 90 and the panel 22 by cam surface 86, and inward or closing motion will be transferred via cam surface 88. It should be pointed out with respect to this embodiment that the top panel 24 carries a plurality of bearing elements 94 which rest against the article 12, the bearing elements 94 being supported inwardly of the top panel 24 so that there is sufficient room at the corner to accommodatte the upstanding parts of he panel coupling means 80 when the fixture 10 is closed.

As stated above, the foaming process causes considerable outward pressure to be applied to the surface of the article being manufactured. In order to provide adequate support for the surfaces of the article in opposition to this pressure, a powered latching means 96 is employed to hold the fixture 10 securely in its closed condition. The latching means 96 is only generally illustrated in FIGURE 1, but it will be seen there that a claw 98 is mounted on the top panel 24 and that a latch pin 100 is rigidly mounted on the front panel 16 by means of a suitable bracket 102.

As best seen in the perspective view of FIGURE 6, the claw 98 is made up of a pair of side plates 104 and 106, shaped as shown and held in parallel spaced relation by means of spacer pins 108, 110 and 111, the pins 110 and 111 also serving as pivot pins for the parts as will appear more fully hereinafter. The lower ends 112 and 113 of the plates 104 and 106, respectively, are hook-shaped to engage the latch pin 100. Claw 98 is supported on the top panel 24 by means of a suitable bracket 114. The claw 98 is movably mounted on the bracket 114 by means of a pair of pivot links 116 and 118 which are journalled at their upper ends on the pin 110 and are supported at their lower ends on a transverse shaft 120 which is in turn carried by a pair of lugs, only one of which, 122, appears in the drawings, welded or otherwise secured to the bracket 114.

A double-acting fluid motor for moving the claw 98 between its latched and unlatched conditions is illustrated at 126 as disposed between a pair of supporting side plates 128 and 130 which are welded to the bracket 114. The cylinder 132 or the motor 126 is attached in conventional manner to the transverse pin 134 fixedly mounted between the plates 128 and 130. The ram 136 of the motor 126 extends forwardly toward the clam 98 and terminates in a block 138 which provides support for a pair of transversely extending journal and guide pins 140 and 142. The ends of the guide pins 140 and 142 are received between pairs of guide ribs 144 and 146 on the side plates 128 and 130, respectively, so as to guide the block 138 for linear movement parallel to the general plane of top panel 24. Motor 126 is connected to the claw 98 by means of connecting links 148 and 150 which extend as shown between the guide pins 140 and 142 and the pin 111 on the claw 98.

A cam element 152 is provided which serves to transfer the motion or force of the motor 126 into the latching direction of the latching means 96, as well as to control the manner in which the claw 98 moves to accomplish its latching function. As best illustrated in FIGURE 7, the length of the connecting links 148 and 150 and the spacing and position of the pins 110 and 111 on the claw 98 are selected such that a turning moment is provided which tends to pivot the claw 98 in the counterclockwise direction around the pin 110 during extension of ram 136, and in the clockwise direction during retraction thereof. This arrangement also provides a downward component of force which holds the pin 111 into contact with the cam surface 154 on the cam element 152 during extension of the ram 136. Cam surface 154 terminates in a cam slot 156 as shown which acts to control the movement of claw 98 near the end of the unlatching travel of the claw.

The arrangement of the pivoting links 116 and 118 for the claw 98 and the cam surface 154 and cam slot 156 cooperates to drive the claw 98 through a path which provides a substantial amount of vertical travel thereof, that is, travel thereof in the latching direction as seen in FIGURES 7 and 8, as well as sufficient outward travel to the right, so that the claw 98 will clear the latch pin 100 when the top panel 24 is raised or lowered. The open or unlatched position of the latching means 96 is illustrated in solid lines in FIGURE 8. Opening motion of the claw 98 may be limited by the engagement of pin 111 with the end of slot 156 or the links 116 and 118 may be provided with stop surfaces which engage the face of bracket 114 at the desired limit of claw travel. Such a stop surface on link 116 appears in FIGURE 7 at 158.

In moving from the open condition of FIGURE 8 to the closed condition of FIGURE 9, by retraction of ram 136, the hook end of claw 98 is initially caused to move inwardly toward the panel 16 by the bell crank action of claw 98 around the pin 110. The shape of the cam element 152 and the dimensions of the parts are arranged so that the hook end of claw 98 will move into position beneath the latch pin 100 before the links 116 and 118 begin to pivot about pin 120. The combined actions of the cam element 152 and the pivoting of links 116 and 118 thereafter produce motion of the hook end of claw 98 in the latching direction, parallel to the general plane of panel 16, so that the top panel 24 will be drawn down into forcible contact with the article 12.

The spacing and positions of the pins 110 and 120 is additionally selected to produce a toggle action in the links 116 and 118 at the end of retraction of ram 136. In this manner, the device is self-locking in the closed condition, and the pressure need not be maintained in the motor 126 after the latch has closed.

In addition to the downward bias just referred to, a lateral bias is also imposed on the top panel 24 by means of a cam surface 160 which is provided on the lug 122 as seen in FIGURES 6 and 8. As shown, the cam surface 160 bears against the latch pin 100 when the latch is in the closed or engaged condition and as the top panel 24 is drawn downwardly by the latch force, the front panel 16 will be biased inwardly to the left as seen in FIGURE 8. The reaction force of this biasing will tend to draw the top panel 24 to the right, and since the top panel 24 is connected to the back panel 18, the bias of the latching means 96 will be transferred to the back panel 18. The inward bias of the front panel 16 will be transferred, as described above, through the panel coupling means 46 and 48 to the end panels 20 and 22. Thus, the latching force provided by the motor 126 will be transferred or transmitted to all of the panels of the fixture 10 so that they will simultaneously resist the outward forces imposed by the expanding resin within the article 12.

It should now be apparent that a fixture has been described which fulfills all of the objectives of the invention set forth hereinabove. Since there are various changes and modifications which will occur to those skilled in the art having the benefit of the above disclosure, it is to be understood that within the scope of the appended claims the invention may be practiced otherwise than as herein specifically described.

I claim:

1. A fixture for providing mechanical support for a foamed-in-place resin filled article during expansion of said resin, the article having a plurality of angularly related surfaces, said fixture comprising a base member, a plurality of supporting panels mounted on said base member, each of said supporting panels being movable between a supporting position in parallel abutting relation to a surface of said article and a retracted position in spaced relation therefrom, powered latching means acting between two of said panels, and means for transferring the holding force of said latching means to the remaining panels whereby all of said panels will be held in their supporting positions when said latching means is engaged.

2. A fixture as defined in claim 1, wherein said article surfaces include side surfaces and a top surface, said supporting panels comprising side panels and a top panel, said latching means acting between said top panel and one of said side panels.

3. A fixture as defined in claim 2 wherein said latching means comprises a claw movably mounted on said top panel and having a hook-shaped end, a latch pin mounted on said one side panel and adapted to be engaged by said hook-shaped end on said claw, and power means for biasing said hook-shaped end against said pin in a direction so as to hold said top panel against said article, said force transferring means further including a cam element on said top panel for engaging said pin for transferring force from said power means to said one side panel.

4. A fixture as defined in claim 3 wherein said power means comprises a fluid motor having a cylinder and a ram, said fluid motor being mounted on said top panel with its axis substantially parallel to the general plane of said top panel, said latching means further comprising a link pivotally mounted at one of its ends on said top panel for rotation about a first axis, and claw being pivotally mounted on said link at the other end thereof for rotation about a second axis, means coupling said claw to said ram whereby extension and retraction of said ram will move said claw by pivoting said link about said first axis, and means controlling the pivotal movement of said claw about said second axis during pivoting of said link about said first axis to cause said hook-shaped end on said claw to move through a substantial distance in a direction parallel to the general plane of said one side panel.

5. A fixture as defined in claim 4 wherein said means coupling said claw to said ram comprises a connecting link pivotally attached at one of its ends to said ram and a pivot pin attaching the other end of said connecting link to said claw, said controlling means comprising a cam mounted on said top panel, said pivot pin also defining a cam follower and engaging said cam during extension and retraction of said ram.

6. A fixture as defined in claim 3, wherein said force transferring means includes means coupling one of said side panels to another of said side panels.

7. A fixture as defined in claim 6 wherein said side surfaces of said article comprise a front surface, a back surface and two end surfaces, said side panels comprising a front panel, a back panel and two end panels, said panel coupling means acting between said front panel and one of said end panels, said top panel being connected to said back panel whereby the reaction force produced by said cam element will be transferred through said top panel to said back panel.

8. A fixture as defined in claim 7 wherein said force transferring means further comprises a second panel coupling means acting between said front panel and the other of said end panels.

9. A fixture as defined in claim 6 wherein said panel coupling means comprises a bar fixedly attached to one of said side panels, said bar having a pair of parallel cam surfaces thereon, and cam follower means on the other of said side panels in engagement with said cam surfaces, one of said cam surfaces acting to move said other side panel to its supporting position upon movement of said one side panel to its supporting position, and the other of said cam surfaces acting to move said other side panel to its retracted position upon movement of said one side panel to its retracted position.

10. A fixture as defined in claim 9 wherein said cam surfaces are defined by external surfaces on said bar, said cam follower means comprising a first cylindrical element for engaging one of said cam surfaces, a second cylindrical element for engaging the other of said cam surfaces and means fixedly mounting said cylindrical elements on said other side panel, said bar extending between said cylindrical elements.

11. A fixture as defined in claim 9 wherein said bar has an elongated slot therein, said slot having parallel sides defining said cam surfaces, said cam follower means comprising a pin fixedly mounted on said other side panel and extending into said slot, the diameter of said pin substantially equalling the width of said slot.

12. A fixture as defined in claim 9, wherein said cam surfaces are straight and are directed at an angle to said other side panel which is equal to half the angle between the directions of movement of the coupled side panels whereby a one-to-one ratio is established between the displacement of said side panels.

13. Powered latching means for securing together a pair of panels the general planes of which are angularly disposed with respect to each other, comprising a claw movably mounted on one of said panels and having a hook-shaped end, a latching pin mounted on the other of said panels and adapted to be engaged by said hook-shaped end on said claw, power means comprising a fluid motor having a cylinder and a ram, for biasing said hook-shaped end against said pin, said motor being mounted on said one panel with its axis substantially parallel to the general plane of said one panel, a link pivotally mounted at one end thereof on said one panel for rotation about a first axis, said claw being pivotally mounted on said link at the other end thereof for rotation about a second axis, means coupling said claw to said ram whereby extension and retraction of said ram will move said claw by pivoting said link about said first axis, and means controlling the pivotal movement of said claw about said second axis during pivoting of said link about said first axis to cause said hook-shaped end on said claw to move through a substantial distance in a direction parallel to the general plane of said other panel.

14. A powered latching means as defined in claim 13 wherein said means coupling said claw to said ram comprises a connecting link pivotally attached at one of its ends to said ram and a pivot pin attaching the other end of said connecting link to said claw, said controlling means comprising a cam mounted on said one panel, said pivot pin also defining a cam follower and engaging said cam during extension and retraction of said ram.

References Cited

UNITED STATES PATENTS

| | | |
|---|---|---|
| 714,184 | 11/1902 | Hutchings. |
| 801,249 | 10/1905 | Keagy _____ 249—170 X |
| 2,834,089 | 5/1958 | Bast et al. _____ 25—130 X |
| 3,042,973 | 7/1962 | Brockhues et al. _____ 18—5 X |
| 3,163,686 | 12/1964 | Dusel et al. _____ 18—5 X |
| 3,348,802 | 10/1967 | Corbett _____ 249—172 X |

J. HOWARD FLINT, JR., *Primary Examiner.*